(12) United States Patent
Wu et al.

(10) Patent No.: US 11,588,530 B2
(45) Date of Patent: Feb. 21, 2023

(54) INFORMATION FEEDBACK METHOD, TERMINAL, AND BASE STATION

(71) Applicant: ZTE CORPORATION, Shenzhen (CN)

(72) Inventors: Hao Wu, Shenzhen (CN); Zhaohua Lu, Shenzhen (CN); Yijian Chen, Shenzhen (CN); Chuangxin Jiang, Shenzhen (CN); Nan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 197 days.

(21) Appl. No.: 15/734,198

(22) PCT Filed: May 28, 2019

(86) PCT No.: PCT/CN2019/088834
§ 371 (c)(1),
(2) Date: Dec. 1, 2020

(87) PCT Pub. No.: WO2019/228354
PCT Pub. Date: Dec. 5, 2019

(65) Prior Publication Data
US 2021/0167833 A1 Jun. 3, 2021

(30) Foreign Application Priority Data
Jun. 1, 2018 (CN) .......................... 201810556561.8

(51) Int. Cl.
*H04B 7/02* (2018.01)
*H04B 7/06* (2006.01)
*H04B 7/0417* (2017.01)

(52) U.S. Cl.
CPC ......... *H04B 7/0634* (2013.01); *H04B 7/0417* (2013.01); *H04B 7/0626* (2013.01)

(58) Field of Classification Search
CPC ... H04B 7/0634; H04B 7/0417; H04B 7/0626
(Continued)

(56) References Cited

U.S. PATENT DOCUMENTS 9,838,104 B1 12/2017 Zhang et al.
2008/0317156 A1 12/2008 Sivanesan et al.
(Continued)

FOREIGN PATENT DOCUMENTS

CN 101919171 A 12/2010
CN 102740325 A 10/2012
(Continued)

OTHER PUBLICATIONS

International Search Report for Application No. PCT/US2019/088834, dated Jul. 25, 2019, 4 pages.
(Continued)

*Primary Examiner* — Zewdu A Kassa
(74) *Attorney, Agent, or Firm* — Morgan, Lewis & Bockius LLP (57) ABSTRACT

Provided are an information feedback method, terminal, base station, a storage medium, and an electronic device. The method includes: decomposing a channel state information (CSI) matrix H to obtain a matrix $U_d$ and a matrix $V_d$, where $U_d$ is a matrix having d columns, and every two column vectors are mutually orthogonal; and $V_d$ is a matrix having d columns, and every two column vectors are mutually orthogonal; and feeding back amplitude and phase information of elements in $U_d$ including d left eigenvectors and/or amplitude and phase information of elements in $V_d$ including d right eigenvectors.

14 Claims, 3 Drawing Sheets

(58) Field of Classification Search
USPC .................................. 375/267, 219, 295, 316
See application file for complete search history.

(56) References Cited

U.S. PATENT DOCUMENTS

| | | |
|---|---|---|
| 2011/0111747 A1 | 5/2011 | Tosato |
| 2013/0201912 A1 | 8/2013 | Sheng et al. |
| 2014/0105316 A1* | 4/2014 | Yuan .................... H04B 7/0413 375/260 |
| 2018/0083683 A1* | 3/2018 | Kim ..................... H04B 7/0626 |
| 2019/0363774 A1* | 11/2019 | Mao ..................... H04B 7/0421 |

FOREIGN PATENT DOCUMENTS

| | | |
|---|---|---|
| CN | 103312440 A | 9/2013 |
| CN | 106685582 A | 5/2017 |
| CN | 106953672 A | 7/2017 |
| CN | 107294642 A | 10/2017 |
| WO | WO-2012051058 A1 | 4/2012 |
| WO | WO-2017157282 A1 | 9/2017 |

OTHER PUBLICATIONS

Chinese Office Action for Application No. 201810556561.8, dated Aug. 27, 2021, 29 pages including translation.
Extended European Search Report for Application No. 19809976.4, dated Feb. 24, 2022, 9 pages.

* cited by examiner

INFORMATION FEEDBACK METHOD, TERMINAL, AND BASE STATION

CROSS-REFERENCE TO RELATED APPLICATIONS

This is a National Stage Application, filed under 35 U.S.C. 371, of International Patent Application No. PCT/CN2019/088834, filed on May 28, 2019, which claims priority to Chinese Patent Application No. 201810556561.8 filed with the CNIPA on Jun. 1, 2018, the disclosures of which are incorporated herein by reference in their entireties.

TECHNICAL FIELD

The present application relates to the field of communications and, in particular, to an information feedback method, terminal, and base station.

BACKGROUND

In a multiple input multiple output (MIMO) wireless communications system, precoding or beamforming is performed on multiple transmit antennas, thereby achieving the purpose of improving transmission efficiency and reliability. In order to implement high-performance precoding or beamforming, a precoding matrix or a beamforming vector needs to be well matched with a channel, which requires that a transmit end can smoothly obtain channel state information (CSI). Therefore, CSI feedback is a key technology for implementing high-performance precoding or beamforming in the MIMO system. However, when the CSI feedback is performed, quantization feedback on a channel matrix will bring a relatively large feedback overhead, especially for CSI feedback supporting multiple sub-bands, the feedback overhead is an important issue that restricts performance improvement.

A CSI quantization feedback technology is an important part of a MIMO technology. Discrete Fourier transform (DFT) vectors or variations of DFT vectors, such as a Kronecker product of multiple DFT vectors, or cascaded DFT vectors, or cascaded DFT vectors subjected to a phase adjustment, are usually used in a traditional wireless communication system. A terminal reports precoding indication information in the above-mentioned form to a base station through the quantization feedback. Such type of precoding codebook may be classified as a first type of codebook, which has a relatively small overhead, but has relatively low CSI quantization precision and limited performance. For another codebook, DFT vectors or Kronecker products of DFT vectors are linearly weighted, and the information related to the DFT vectors and the amplitude and phase information of weighting coefficients are fed back to the base station as the precoding indication information. Such precoding codebook may be classified as a second type of codebook. This codebook has relatively high CSI quantization precision but a larger CSI overhead, especially has a relatively large CSI feedback overhead when high-rank DFT vectors or many DFT vectors are linearly weighted and combined.

In view of the preceding issue in the related art, no effective scheme has yet been proposed.

SUMMARY

An information feedback method, a terminal, a base station, a storage medium, and an electronic device are provided in embodiments of the present disclosure.

An information feedback method is provided according to the present application. The method includes steps described below, a CSI matrix H is decomposed to obtain a matrix $U_d$ and a matrix $V_d$, where $U_d$ is a matrix having d columns, and every two column vectors of all columns are mutually orthogonal; and $V_d$ is a matrix having d columns, and every two column vectors of all columns are mutually orthogonal; and at least one of amplitude and phase information of elements in $U_d$ including d left eigenvectors and/or amplitude and phase information of elements in $V_d$ including d right eigenvectors are fed back.

An information feedback method is provided according to the present application. The method includes steps described below, first amplitude and phase information, which is fed back by a user equipment (UE), of elements in $U_d$ including d left eigenvectors, and/or second amplitude and phase information, which is fed back by the UE, of elements in $V_d$ including d right eigenvectors, is received, where $U_d$ is a matrix having d columns, and every two column vectors of all columns are mutually orthogonal; and $V_d$ is a matrix having d columns, and every two column vectors of all columns are mutually orthogonal; and the first amplitude and phase information and/or the second amplitude and phase information are determined as channel state information (CSI) of the UE.

An information feedback terminal is provided according to the present application, and the terminal includes a decomposition module and a feedback module. The decomposition module is configured to decompose a matrix H to obtain a matrix $U_d$ and a matrix $V_d$, where $U_d$ is a matrix having d columns, and every two column vectors of all columns are mutually orthogonal; and $V_d$ is a matrix having d columns, and every two column vectors of all columns are mutually orthogonal. The feedback module is configured to feed back amplitude and phase information of elements in $U_d$ including d left eigenvectors and/or feed back amplitude and phase information of elements in $V_d$ including d right eigenvectors.

An information feedback base station is provided according to the present application, and the base station includes a receiving module and a determination module. The receiving module is configured to receive first amplitude and phase information, which is fed back by a user equipment (UE), of elements in $U_d$ including d left eigenvectors, and/or receive second amplitude and phase information, which is fed back by the UE, of elements in $V_d$ including d right eigenvectors; where $U_d$ is a matrix having d columns, and every two column vectors of all columns are mutually orthogonal; and $V_d$ is a matrix having d columns, and every two column vectors of all columns are mutually orthogonal. The determination module is configured to determine the first amplitude and phase information and/or the second amplitude and phase information as channel state information (CSI) of the UE.

A storage medium is further provided according to the present application. The storage medium stores a computer program which is configured to, when executed, perform the steps of any one of the preceding method embodiments.

An electronic apparatus is further provided according to the present application, and includes a memory and a processor. The memory stores a computer program, and the processor is configured to execute the computer program for performing the steps in any one of the preceding method embodiments.

According to the present application, information of matrix vectors are used to feed back the CSI, which can avoid an excessive CSI feedback overhead in the related art and improve the utilization rate of resources.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Hereinafter, the present application will be described in detail with reference to drawings and in conjunction with embodiments. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment One

Figure 1:
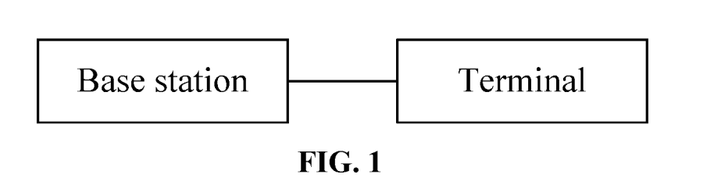
FIG. 1 is a network architecture diagram according to an embodiment of the present disclosure.

The embodiment of the present application may operate on a network architecture shown in FIG. 1. FIG. 1 is a network architecture diagram according to an embodiment of the present application. As shown in FIG. 1, the network architecture includes a terminal and a base station, where the base station interacts with the terminal.

Figure 2:
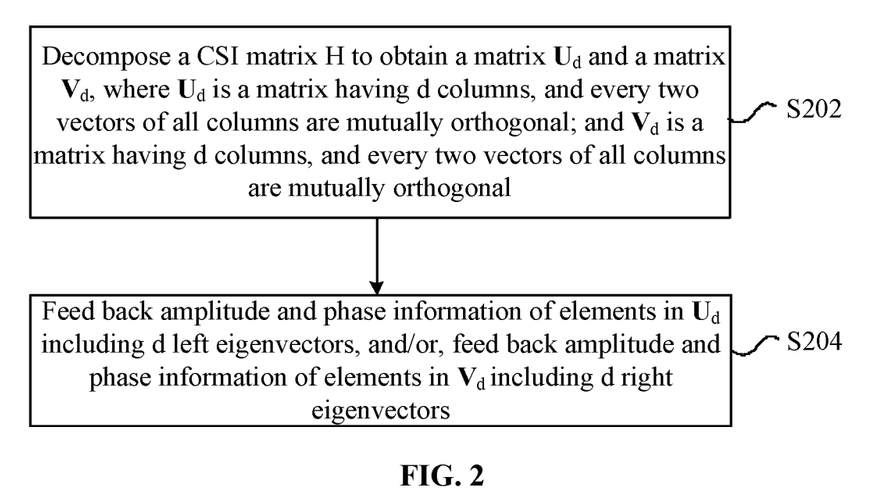
FIG. 2 is a flowchart of an information feedback method according to an embodiment of the present disclosure.

An information feedback method executing on the network structure is provided in the embodiment. FIG. 2 is a flowchart of an information feedback method according to an embodiment of the present disclosure. As shown in FIG. 2, the process of the method includes steps described below.

In step S202, a CSI matrix H is decomposed to obtain a matrix $U_d$ and a matrix $V_d$, where $U_d$ is a matrix having d columns, and every two column vectors of $U_d$ are mutually orthogonal; and $V_d$ is a matrix having d columns, and every two column vectors of $V_d$ are mutually orthogonal.

In step S204, amplitude and phase information of elements in $U_d$ including d left eigenvectors is fed back, and/or, amplitude and phase information of elements in $V_d$ including d right eigenvectors is fed back.

According to the preceding steps, information of matrix vectors are used to feed back the CSI, which can avoid an excessive CSI feedback overhead in the related art and improve the utilization rate of resources.

In an embodiment, the preceding steps may, but may not necessarily, be executed by the terminal such as a mobile phone.

The step in which the matrix H is decomposed to obtain the matrix $U_d$ and the matrix $V_d$ includes performing singularly valuable decomposition (SVD) on the matrix H to obtain the matrix $U_d$ and the matrix $V_d$.

In the present embodiment, the SVD refers to that a matrix is written as the product $UDV^H$ of three matrices U, V, and D; an eigenvector may also be referred to as a singular vector, an orthogonal base vector, etc.; an eigenvalue refers to a diagonal element of an intermediate matrix after SVD or eigenvalue decomposition is performed. The scheme in the embodiment is still applicable after rows and columns are switched or left and right are switched in the embodiment.

Alternatively, the matrix H is formed by combining precoding matrices on all sub-bands for an $r^{th}$ layer, where $1 \leq r \leq R$, r is an integer, and R is a total number of channel layers.

Alternatively, after decomposing the matrix H to obtain the matrix $U_d$ and the matrix $V_d$, the method further includes feeding back a channel quality indicator (CQI) of a sub-band.

Alternatively, an assumed precoding matrix for calculating a CQI of an $m^{th}$ sub-band is: for the $m^{th}$ sub-band, a matrix formed by combining column vectors corresponding to the $m^{th}$ sub-band after $U_d$ and $V_d^H$ of each layer of multiple layers are multiplied. $V_d^H$ is a conjugate transpose of $V_d$.

Alternatively, a value of d is determined in at least one of the following manners: determining the value of d through signaling configured by the base station; determining, according to a first threshold value determined by the terminal or configured by the base station, the number of eigenvalues, which are greater than the first threshold value, as the value of d; or determining, according to a second threshold value determined by a terminal or configured by a base station, that the value of d is one of: the number of eigenvalues, each of which has a ratio to an average value of all eigenvalues greater than the second threshold value, or the number of eigenvalues, each of which has a ratio to a minimum value of all eigenvalues greater than the second threshold value.

Alternatively, the matrix H includes weighting coefficients for weighting and combining L codebook base vectors, where L is an integer greater than 1.

Alternatively, the matrix H is a matrix having M rows and 2L columns, and M is a number of sub-bands included in a CSI feedback bandwidth.

Alternatively, an element of an $m^{th}$ row and an $n^{th}$ column of the matrix H is at least one of: in a case where $n \leq L$, a weighting coefficient of an $n^{th}$ codebook base vector with respect to a first half of antenna ports on an $m^{th}$ sub-band; or, in a case where $n > L$, a weighting coefficient of an $(-L)^{th}$ codebook vector with respect to a second half of antenna ports on an $m^{th}$ sub-band.

Alternatively, the matrix H is formed by combining R layers of CSI.

Alternatively, the step of decomposing the matrix H includes E times of SVD, where $E \geq 1$, and a number of rows of a matrix decomposed by an $e^{th}$ time of SVD is equal to at least one of: a number of antenna ports, one of a number of codebook base vectors or twice the number of codebook base vectors, a number of sub-bands, or a number of channel layers, where e is an integer which is greater than or equal to 1 and less than or equal to E.

Alternatively, the step of decomposing the matrix H includes E times of SVD, where E≥1, and the number of columns of a matrix decomposed by an $e^{th}$ time of SVD is equal to at least one of: the number of antenna ports, one of the number of codebook base vectors or twice the number of codebook base vectors, the number of sub-bands, the number of channel layers, or a product of at least two of: the number of antenna ports, one of the number of codebook base vectors or twice the number of codebook base vectors, the number of sub-bands, or the number of channel layers; where e is an integer which is greater than or equal to 1 and less than or equal to E.

Alternatively, the step of decomposing the matrix H includes E times of SVD, where E≥1, and a serial number of a corresponding element in a matrix decomposed by an $e^{th}$ time of SVD is obtained by a linear transformation of at least one of a serial number of a port, a serial number of a sub-band, or a serial number of a layer.

Alternatively, the matrix H satisfies at least one of that:
the number of rows is equal to the number of sub-bands, the number of columns is equal to a product of the number of ports and the number of layers, and one of an element of an $m^{th}$ row and an $[n+(r-1)N]^{th}$ column or an element of an $m^{th}$ row and an $[r+(n-1)R]^{th}$ column is a precoding coefficient on an $n^{th}$ port, on an $m^{th}$ sub-band and on an $r^{th}$ layer;

the number of rows is equal to the number of antenna ports, the number of columns is equal to a product of the number of sub-bands and the number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, on an $m^{th}$ sub-band and on an $r^{th}$ layer; or the number of rows is equal to the number of layers, the number of columns is equal to a product of the number of sub-bands and the number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, on an $m^{th}$ sub-band and on an $r^{th}$ layer.

N is the number of antenna ports of a channel state information reference signal (CSI-RS), and M is the number of sub-bands included in the CSI feedback bandwidth.

Alternatively, the step of decomposing the matrix H includes E times of SVD, where E≥1; the amplitude and phase information of the elements in $U_d$ including the d left eigenvectors corresponding to each decomposition is fed back, and/or, the amplitude and phase information of the elements in $V_d$ including the d right eigenvectors corresponding to each decomposition is fed back.

Alternatively, the step of decomposing the matrix H includes E times of SVD, where E≥1, and an assumed precoding matrix for calculating a fed back CQI of a sub-band is obtained according to a product of transposed matrices of $U_d^e$ and $V_d^e$, where $V_d^e$ is first d columns of a Kronecker product of matrices each of which is formed by d left eigenvectors obtained from each time of other (E−1) times of SVD except an $e^{th}$ time of SVD, and $U_d^e$ is a matrix formed by d left eigenvectors obtained from the $e^{th}$ time of SVD.

Alternatively, an element in the assumed precoding matrix of the CQI of the sub-band is obtained according to a corresponding element after a linear transformation of one of a serial number of a row or serial number of a column is performed on a product of matrices.

Figure 3:
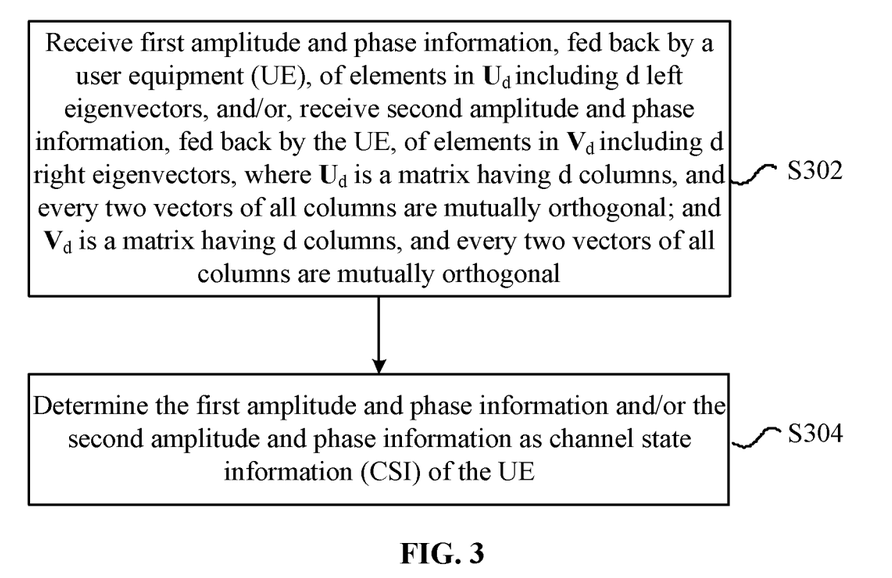
FIG. 3 is a flowchart of another information feedback method according to an embodiment of the present disclosure.

An information feedback method executing on the network structure is provided in the embodiment. FIG. 3 is a flowchart of another information feedback method according to an embodiment of the present disclosure. As shown in FIG. 3, the process of the method includes steps described below.

In step S302, first amplitude and phase information, fed back by a UE, of elements in $U_d$ including d left eigenvectors, is received, and/or, second amplitude and phase information, fed back by the UE, of elements in $V_d$ including d right eigenvectors, is received, where $U_d$ is a matrix having d columns, and every two column vectors of $U_d$ are mutually orthogonal; and $V_d$ is a matrix having d columns, and every two column vectors of $V_d$ are mutually orthogonal.

In step S304, the first amplitude and phase information and/or the second amplitude and phase information are determined as channel state information (CSI) of the UE.

Alternatively, the matrix $U_d$ and the matrix $V_d$ are obtained by performing singularly valuable decomposition (SVD) on a matrix H.

Alternatively, the matrix H is formed by combining precoding matrices on all sub-bands for an $r^{th}$ layer, where 1≤r≤R, r is an integer, and R is a total number of channel layers.

Alternatively, after decomposing the matrix H to obtain the matrix $U_d$ and the matrix $V_d$, the method further includes receiving a channel quality indicator (CQI) of a sub-band fed back by the terminal.

Alternatively, an assumed precoding matrix for calculating a CQI of an $m^{th}$ sub-band is: for the $m^{th}$ sub-band, a matrix formed by combining column vectors corresponding to the $m^{th}$ sub-band after $U_d$ and $V_d^H$ of each layer are multiplied.

Alternatively, a value of d is determined in at least one of the manners described below.

The value of d is determined through signaling configured by the base station.

According to a first threshold value determined by the terminal or configured by the base station, the value of d is determined as the number of eigenvalues which are greater than the first threshold value.

According to a second threshold value determined by the terminal or configured by the base station, the value of d is determined as one of: the number of eigenvalues, each of which has a ratio to an average value of all eigenvalues greater than the second threshold value, or the number of eigenvalues, each of which has a ratio to a minimum value of all eigenvalues greater than the second threshold value.

Alternatively, the matrix H includes weighting coefficients for weighting and combining L codebook base vectors, where L is an integer greater than 1.

Alternatively, the matrix H is a matrix having M rows and 2L columns, and M is the number of sub-bands included in a CSI feedback bandwidth.

Alternatively, an element of an $m^{th}$ row and an $n^{th}$ column of the matrix H is at least one of: in a case where n≤L, a weighting coefficient of an $n^{th}$ codebook base vector with respect to a first half of antenna ports on an $m^{th}$ sub-band; or in a case where n>L, a weighting coefficient of an $(n-L)^{th}$ codebook vector with respect to a second half of antenna ports on the $m^{th}$ sub-band.

Alternatively, the matrix H is a matrix formed by combining R layers of CSI.

Alternatively, the step of decomposing the matrix H includes E times of SVD, where E≥1, and the number of rows of a matrix decomposed by an $e^{th}$ time of SVD is equal to at least one of: the number of antenna ports, one of the number of codebook base vectors or twice the number of codebook base vectors, the number of sub-bands, or the number of channel layers, where $1 \leq e \leq E$ and e is an integer.

Alternatively, the step of decomposing the matrix H includes E times of SVD, where $E \geq 1$, and the number of columns of a matrix decomposed by an $e^{th}$ time of SVD is equal to at least one of: the number of antenna ports, one of the number of codebook base vectors or twice the number of codebook base vectors, the number of sub-bands, the number of channel layers, or a product of at least two of: the number of antenna ports, one of the number of codebook base vectors or twice the number of codebook base vectors, the number of sub-bands, or the number of channel layers; where $1 \leq e \leq E$, and e is an integer.

Alternatively, the step of decomposing the matrix H includes E times of SVD, where $E \geq 1$, and a serial number of a corresponding element in a matrix decomposed by an $e^{th}$ time of SVD is obtained by a linear transformation of at least one of a serial number of a port, a serial number of a sub-band, or a serial number of a layer.

Alternatively, the matrix H satisfies at least one of that:
the number of rows is equal to the number of sub-bands, the number of columns is equal to a product of the number of ports and the number of layers, and one of an element of an $m^{th}$ row and an $[n+(r-1)N]^{th}$ column or an element of an $m^{th}$ row and an $[r+(n-1)R]^{th}$ column is a precoding coefficient on an $n^{th}$ port, on an $m^{th}$ sub-band and on an $r^{th}$ layer; the number of rows is equal to the number of antenna ports, the number of columns is equal to a product of the number of sub-bands and the number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, on an $m^{th}$ sub-band and on an $r^{th}$ layer; or the number of rows is equal to the number of layers, the number of columns is equal to a product of the number of sub-bands and the number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, on an $m^{th}$ sub-band and on an $r^{th}$ layer.

N is the number of antenna ports of a channel state information reference signal (CSI-RS), and M is the number of sub-bands included in the CSI feedback bandwidth.

Alternatively, the step of decomposing the matrix H includes E times of SVD, where $E \geq 1$; the amplitude and phase information of the elements in $U_d$ including the d left eigenvectors corresponding to each decomposition is received, and/or the amplitude and phase information of the elements in $V_d$ including the d right eigenvectors corresponding to each decomposition is received.

Alternatively, the step of decomposing the matrix H includes E times of SVD, where $E \geq 1$, and an assumed precoding matrix for calculating a received CQI of a sub-band is obtained according to a product of transposed matrices of $U_d^e$ and $V_d^e$, where $V_d^e$ is first d columns of a Kronecker product of matrices each of which is formed by d left eigenvectors obtained from each time of other (E-1) times of SVD except an $e^{th}$ time of SVD, and $U_d^e$ is a matrix formed by d left eigenvectors obtained from the $e^{th}$ time of SVD.

Alternatively, an element in the assumed precoding matrix of the CQI of the sub-band is obtained according to a corresponding element after a linear transformation of one of a serial number of a row or serial number of a column is performed on a product of matrices.

From the description the preceding embodiment, it will be apparent to those skilled in the art that the methods in the preceding embodiment may be implemented by software plus a necessary general-purpose hardware platform, or may of course be implemented by hardware. However, in many cases, the former is an alternative implementation. Based on this understanding, the scheme provided by the present disclosure substantially, or the part contributing to the existing art, may be embodied in the form of a software product. The computer software product is stored on a storage medium (such as a read-only memory (ROM)/random access memory (RAM), a magnetic disk or an optical disk) and includes several instructions for enabling a terminal device (which may be a mobile phone, a computer, a server or a network device) to perform the method according to each embodiment of the present application.

Embodiment Two

An information feedback apparatus is further provided in the present embodiment, and is configured for implementing the preceding embodiment and alternative implementations. What has been described will not be repeated. As used below, the term "module" may be software, hardware or a combination thereof capable of implementing predetermined functions. The apparatus in the embodiment described below is implemented by software, but an implementation by hardware or by a combination of software and hardware is also possible and conceivable.

Figure 4:
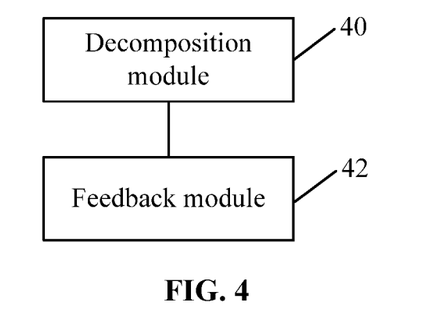
FIG. 4 is a structure block diagram of an information feedback terminal according to an embodiment of the present disclosure.

FIG. 4 is a structure block diagram of an information feedback terminal according to an embodiment of the present disclosure. As shown in FIG. 4, the apparatus includes a decomposition module 40 and a feedback module 42.

The decomposition module 40 is configured to decompose a matrix H to obtain a matrix $H_d$ and a matrix $V_d$, where $U_d$ is a matrix having d columns, and every two column vectors of $U_d$ are mutually orthogonal; and $V_d$ is a matrix having d columns, and every two column vectors of $V_d$ are mutually orthogonal.

The feedback module 42 is configured to feed back amplitude and phase information of elements in $U_d$ including d left eigenvectors and/or feed back amplitude and phase information of elements in $V_d$ including d right eigenvectors.

Alternatively, decomposing the matrix H to obtain the matrix $U_d$ and the matrix $V_d$ includes performing singularly valuable decomposition (SVD) on the matrix H to obtain the matrix $U_d$ and the matrix $V_d$.

In the embodiment, SVD refers to that a matrix is written as the product $UDV^H$ of three matrices, U, D, and V; an eigenvector may also be referred to as a singular vector, an orthogonal base vector, etc.; an eigenvalue refers to a diagonal element of an intermediate matrix after SVD or eigenvalue decomposition is performed. The scheme in the embodiment is still applicable after rows and columns are switched or left and right are switched in the embodiment.

Alternatively, the matrix H is formed by combining precoding matrices on all sub-bands for an $r^{th}$ layer, where $1 \leq r \leq R$, r is an integer, and R is a total number of channel layers.

Alternatively, after decomposing the matrix H to obtain the matrix $U_d$ and the matrix $V_d$, a channel quality indicator (CQI) of a sub-band is fed back.

Alternatively, an assumed precoding matrix for calculating a CQI of an $m^{th}$ sub-band is a matrix, for the $m^{th}$ sub-band, formed by combining column vectors corresponding to the $m^{th}$ sub-band after $U_d$ and $V_d^H$ of each layer are multiplied. $V_d^H$ is a conjugate transpose of $V_d$.

Alternatively, a value of d is determined in at least one of the following manners: determining through signaling configured by a base station; determining, according to a first threshold value determined by a terminal or configured by a base station, the number of eigenvalues which are greater than the first threshold value as the value of d; or determining, according to a second threshold value determined by a terminal or configured by a base station, that the value of d is one of: the number of eigenvalues, each of which has a ratio to an average value of all eigenvalues greater than the second threshold value, or the number of eigenvalues, each of which has a ratio to a minimum value of all eigenvalues greater than the second threshold value.

Alternatively, the matrix H includes weighting coefficients for weighting and combining L codebook base vectors, where L is an integer greater than 1.

Alternatively, the matrix H is a matrix having M rows and 2L columns, and M is the number of sub-bands included in a CSI feedback bandwidth.

Alternatively, an element of an $m^{th}$ row and an $n^{th}$ column of the matrix H is at least one of: in a case where n≤L, a weighting coefficient of an $n^{th}$ codebook base vector with respect to a first half of antenna ports on an $m^{th}$ sub-band; or in a case where n>L, a weighting coefficient of an $(n-L)^{th}$ codebook vector with respect to a second half of antenna ports on the $m^{th}$ sub-band.

Alternatively, the matrix H is formed by combining R layers of CSI.

Alternatively, the decomposition of the matrix H includes E times of SVD, where E≥1, and the number of rows of a matrix decomposed by an $e^{th}$ time of SVD is equal to at least one of: the number of antenna ports, one of the number of codebook base vectors or twice the number of codebook base vectors, the number of sub-bands, or the number of channel layers, where e is an integer which is greater than or equal to 1 and less than or equal to E.

Alternatively, the decomposition of the matrix H includes E times of SVD, where E≥1, and the number of columns of a matrix decomposed by an $e^{th}$ time of SVD is equal to at least one of: the number of antenna ports, one of the number of codebook base vectors or twice the number of codebook base vectors, the number of sub-bands, the number of channel layers, or a product of at least two of the following parameters: the number of antenna ports, one of the number of codebook base vectors or twice the number of codebook base vectors, the number of sub-bands, or the number of channel layers; where e is an integer which is greater than or equal to 1 and less than or equal to E.

Alternatively, the decomposition of the matrix H includes E times of SVD, where E≥1, and a serial number of a corresponding element in a matrix decomposed by an $e^{th}$ time of SVD is obtained by a linear transformation of at least one of a serial number of a port, a serial number of a sub-band, or a serial number of a layer.

Alternatively, the matrix H satisfies at least one of that:
the number of rows is equal to the number of sub-bands, the number of columns is equal to a product of the number of ports and the number of layers, and one of an element of an $m^{th}$ row and an $[n+(r-1)N]^{th}$ column or an element of an $m^{th}$ row and an $[r+(n-1)R]^{th}$ column is precoding coefficient on an $n^{th}$ port, on an $m^{th}$ sub-band and on an $r^{th}$ layer;
the number of rows is equal to the number of antenna ports, the number of columns is equal to a product of the number of sub-bands and the number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, on an $m^{th}$ sub-band and on an $r^{th}$ layer; or
the number of rows is equal to the number of layers, the number of columns is equal to a product of the number of sub-bands and the number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, on an $m^{th}$ sub-band and on an $r^{th}$ layer.

N is the number of antenna ports of a channel state information reference signal (CSI-RS), and M is the number of sub-bands included in the CSI feedback bandwidth.

Alternatively, the decomposition of the matrix H includes E times of SVD, where E≥1; the amplitude and phase information of the elements in $U_d$ including the d left eigenvectors corresponding to each decomposition is fed back, and/or the amplitude and phase information of the elements in $V_d$ including the d right eigenvectors corresponding to each decomposition is fed back.

Alternatively, the decomposition of the matrix H includes E times of SVD, where E≥1, and an assumed precoding matrix for calculating a fed back CQI of a sub-band is obtained according to a product of transposed matrices of $U_d^e$ and $V_d^e$, where $V_d^e$ is first d columns of a Kronecker product of matrices each of which is formed by d left eigenvectors obtained from each time of other (E-1) times of SVD except an $e^{th}$ time of SVD, and $U_d^e$ is a matrix formed by d left eigenvectors obtained from the $e^{th}$ time of SVD.

Alternatively, an element in the assumed precoding matrix of the CQI of the sub-band is obtained according to a corresponding element after a linear transformation of one of a serial number of a row or serial number of a column is performed on a product of matrices.

Figure 5:
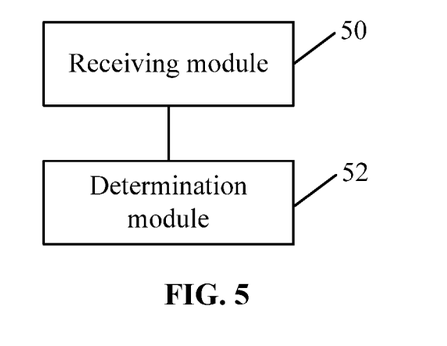
FIG. 5 is a structure block diagram of an information feedback base station according to an embodiment of the present disclosure.

FIG. 5 is a structure block diagram of an information feedback base station according to an embodiment of the present disclosure. As shown in FIG. 5, the apparatus includes a receiving module 50 and a determination module 52.

The receiving module 50 is configured to receive first amplitude and phase information, fed back by a user equipment (UE), of elements in $U_d$ including d left eigenvectors and/or second amplitude and phase information, fed back by the UE, of elements in $V_d$ including d right eigenvectors, where $U_d$ is a matrix having d columns, and every two column vectors of $U_d$ are mutually orthogonal; and $V_d$ is a matrix having d columns, and every two column vectors of $V_d$ are mutually orthogonal.

The determination module 52 is configured to determine the first amplitude and phase information and/or the second amplitude and phase information as channel state information (CSI) of the UE.

Alternatively, the matrix $U_d$ and the matrix $V_d$ are obtained by performing singularly valuable decomposition (SVD) on a matrix H.

Alternatively, the matrix H is formed by combining precoding matrices on all sub-bands for an $r^{th}$ layer, where 1≤r≤R, r is an integer, and R is a total number of channel layers.

Alternatively, after decomposing the matrix H to obtain the matrix $U_d$ and the matrix $V_d$, a channel quality indicator (CQI) of a sub-band fed back by the terminal is received.

Alternatively, an assumed precoding matrix for calculating a CQI of an $m^{th}$ sub-band is a matrix: for the $m^{th}$ sub-band, formed by combining column vectors corresponding to the $m^{th}$ sub-band after $U_d$ and $V_d^H$ of each layer are multiplied.

Alternatively, a value of d is determined in at least one of the manners described below.

The value of d is determined through signaling configured by a base station.

According to a first threshold value determined by a terminal or configured by a base station, the value of d is determined as the number of eigenvalues which are greater than the first threshold value.

According to a second threshold value determined by a terminal or configured by a base station, the value of d is determined as one of: the number of eigenvalues, each of which has a ratio to an average value of all eigenvalues greater than the second threshold value, or the number of eigenvalues, each of which has a ratio to a minimum value of all eigenvalues greater than the second threshold value.

Alternatively, the matrix H includes weighting coefficients for weighting and combining L codebook base vectors, where L is an integer greater than 1.

Alternatively, the matrix H is a matrix having M rows and 2L columns, and M is the number of sub-bands included in a CSI feedback bandwidth.

Alternatively, an element of an $m^{th}$ row and an $n^{th}$ column of the matrix H is at least one of: in a case where n≤L, a weighting coefficient of an $n^{th}$ codebook base vector with respect to a first half of antenna ports on an $m^{th}$ sub-band; or in a case where n>L, a weighting coefficient of an $(n-L)^{th}$ codebook vector with respect to a second half of antenna ports on the $m^{th}$ sub-band.

Alternatively, the matrix H is formed by combining R layers of CSI.

Alternatively, the decomposition of the matrix H includes E times of SVD, where E≥1, and the number of rows of a matrix decomposed by an $e^{th}$ time of SVD is equal to at least one of: the number of antenna ports, one of the number of codebook base vectors or twice the number of codebook base vectors, the number of sub-bands, or the number of channel layers, where 1≤e≤E, and e is an integer.

Alternatively, the decomposition of the matrix H includes E times of SVD, where E≥1, and the number of columns of a matrix decomposed by an $e^{th}$ time of SVD is equal to at least one of: the number of antenna ports, one of the number of codebook base vectors or twice the number of codebook base vectors, the number of sub-bands, the number of channel layers, or a product of at least two of the following parameters: the number of antenna ports, one of the number of codebook base vectors or twice the number of codebook base vectors, the number of sub-bands, or the number of channel layers; where 1≤e≤E, and e is an integer.

Alternatively, the decomposition of the matrix H includes E times of SVD, where E≥1, and a serial number of a corresponding element in a matrix decomposed by an $e^{th}$ time of SVD is obtained by a linear transformation of at least one of a serial number of a port, a serial number of a sub-band, or a serial number of a layer.

Alternatively, the matrix H satisfies at least one of that:
the number of rows is equal to the number of sub-bands, the number of columns is equal to a product of the number of ports and the number of layers, and one of an element of an $m^{th}$ row and an $[n+(r-1)N]^{th}$ column or an element of an $m^{th}$ row and an $[r+(n-1)R]^{th}$ column is a precoding coefficient on an $n^{th}$ port, on an $m^{th}$ sub-band and on an $r^{th}$ layer;
the number of rows is equal to the number of antenna ports, the number of columns is equal to a product of the number of sub-bands and the number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, on an $m^{th}$ sub-band and on an $r^{th}$ layer; or
the number of rows is equal to the number of layers, the number of columns is equal to a product of the number of sub-bands and the number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, on an $m^{th}$ sub-band and on an $r^{th}$ layer.

N is the number of antenna ports of a channel state information reference signal (CSI-RS), and M is the number of sub-bands included in the CSI feedback bandwidth.

Alternatively, the decomposition of the matrix H includes E times of SVD, where E≥1; the amplitude and phase information of the elements in $U_d$ including the d left eigenvectors corresponding to each decomposition is received, and/or, the amplitude and phase information of the elements in $V_d$ including the d right eigenvectors corresponding to each decomposition is received.

Alternatively, the decomposition of the matrix H includes E times of SVD, where E≥1, and an assumed precoding matrix for calculating a received CQI of a sub-band is obtained according to a product of transposed matrices of $U_d^e$ and $V_d^e$, where $V_d^e$ is first d columns of a Kronecker product of matrices each of which is formed by d left eigenvectors obtained from each time of other (E−1) times of SVD except an $e^{th}$ time of SVD, and $U_d^e$ is a matrix formed by d left eigenvectors obtained from the $e^{th}$ time of SVD.

Alternatively, an element in the assumed precoding matrix of the CQI of the sub-band is obtained according to a corresponding element after a linear transformation of one of a serial number of a row or a serial number of a column is performed on a product of matrices.

It is to be noted that each module described above may be implemented by software or hardware. An implementation by hardware may, but not necessarily, be performed in the following manners: the various modules described above are located in the same processor, or the various modules described above are located in their respective processors in any combination form.

Embodiment Three

A terminal performs the SVD according to R layers of CSI on M sub-bands and on N antenna ports, and feeds back amplitude and phase information of elements in $U_d$ including d left eigenvectors and/or amplitude and phase information of elements in $V_d$ including d right eigenvectors.

The matrix subjected to the SVD is a matrix, for an $r^{th}$ layer, formed by combining precoding matrices preferred or recommended by the terminal on each sub-band.

The terminal feeds back a CQI of a sub-band. An assumed precoding matrix for calculating the CQI of an $m^{th}$ sub-band is a matrix, for the $m^{th}$ sub-band, formed by combining column vectors corresponding to the $m^{th}$ sub-band after $U_d$ and $V_d^H$ of each layer are multiplied.

A value of d is determined in at least one of the manners described below.

The value of d is determined through signaling configured by a base station.

d left eigenvectors and/or d right eigenvectors are associated with d eigenvalues.

According to a determined threshold value or a threshold value configured by the base station, the value of d is determined as the number of eigenvalues which are greater than the threshold value, and the terminal reports the value of d to the base station.

According to a determined threshold value or a threshold value configured by the base station, the value of d is determined as one of: the number of eigenvalues, each of which has a ratio to an average value of all eigenvalues greater than the threshold value, or the number of eigenvalues, each of which has a ratio to a minimum value of all eigenvalues greater than the threshold value, and the terminal reports the value of d to the base station.

The CSI subjected to the SVD is weighting coefficients for weighting and combining L codebook base vectors. The matrix subjected to the SVD is a matrix having M rows and 2L columns.

An element of an $m^{th}$ row and an $n^{th}$ column is at least one of: in a case where n≤L, a weighting coefficient of an $n^{th}$ codebook base vector with respect to a first half of antenna ports on an $m^{th}$ sub-band; or in a case where n>L, a weighting coefficient of an $(n-L)^{th}$ codebook vector with respect to a second half of antenna ports on the $m^{th}$ sub-band.

The matrix subjected to the SVD is a matrix formed by combining R layers of CSI.

K times of SVD is performed for each CSI feedback, where K≥1. A number of rows of a matrix decomposed by a $k^{th}$ time of SVD is equal to at least one of: the number of antenna ports, one of the number of codebook base vectors or twice the number of codebook base vectors, the number of sub-bands, or the number of layers (channel ranks).

K times of SVD is performed for each CSI feedback, where K≥1. The number of columns of a matrix decomposed by a $k^{th}$ time of SVD is equal to a product of at least two of: the number of antenna ports, one of the number of codebook base vectors or twice the number of codebook base vectors, the number of sub-bands, or the number of layers (channel ranks).

K times of SVD is performed for each CSI feedback, where K≥1. A serial number of a corresponding element in a matrix decomposed by a $k^{th}$ time of SVD is obtained by a linear transformation of at least one of a serial number of a port, a serial number of a sub-band, or a serial number of a layer.

Further, the matrix H satisfies at least one of that:
the number of rows is equal to the number of sub-bands, the number of columns is equal to a product of the number of ports and the number of layers, and one of an element of an $m^{th}$ row and an $[n+(r-1)N]^{th}$ column or an element of an $m^{th}$ row and an $[r+(n-1)R]^{th}$ column is a precoding coefficient on an $n^{th}$ port, on an $m^{th}$ sub-band, on an $r^{th}$ layer and preferred or recommended by the terminal;
the number of rows is equal to a number of antenna ports, the number of columns is equal to a product of the number of sub-bands and the number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, on an $m^{th}$ sub-band, on an $r^{th}$ layer and preferred or recommended by the terminal; or
the number of rows is equal to the number of layers, the number of columns is equal to a product of the number of sub-bands and the number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, on an $m^{th}$ sub-band, on an $r^{th}$ layer and preferred or recommended by the terminal.

K times of SVD is performed for each CSI feedback, where K≥1. The terminal feeds back a matrix $U_d^k$ formed by d left eigenvectors obtained from each time of SVD or a matrix $V_d^k$ formed by d right eigenvectors obtained from each time of SVD.

The terminal feeds back a CQI of a sub-band. An assumed precoding matrix for calculating the CQI of the sub-band is obtained according to a product of transposed matrices of $U_d^k$ and $V_d^k$.

$V_d^k$ (is first d columns of a Kronecker product of matrices each of which is formed by d left eigenvectors obtained from each time of other (K−1) times of SVD except a $k^{th}$ time of SVD.

An element in the assumed precoding matrix of the CQI of the sub-band is obtained according to a corresponding element after a linear transformation of one of a serial number of a row or a serial number of a column is performed on a product of matrices.

In the embodiment, the features are still applicable after rows and columns are switched, or left and right are switched; SVD refers to that a matrix is written as the product $UDV^H$ of three matrices U, D, and V; an eigenvector may also be referred to as a singular vector, an orthogonal base vector, etc.; an eigenvalue refers to a diagonal element of an intermediate matrix after eigenvalue decomposition is performed.

The present embodiment further includes implementations described below.

Implementation one: Separate Processing for Each Layer

In the present application, CSI feedback is performed by using a method of phase and/or amplitude compression of frequency domain and spatial domain channel coefficients.

Figure 6:
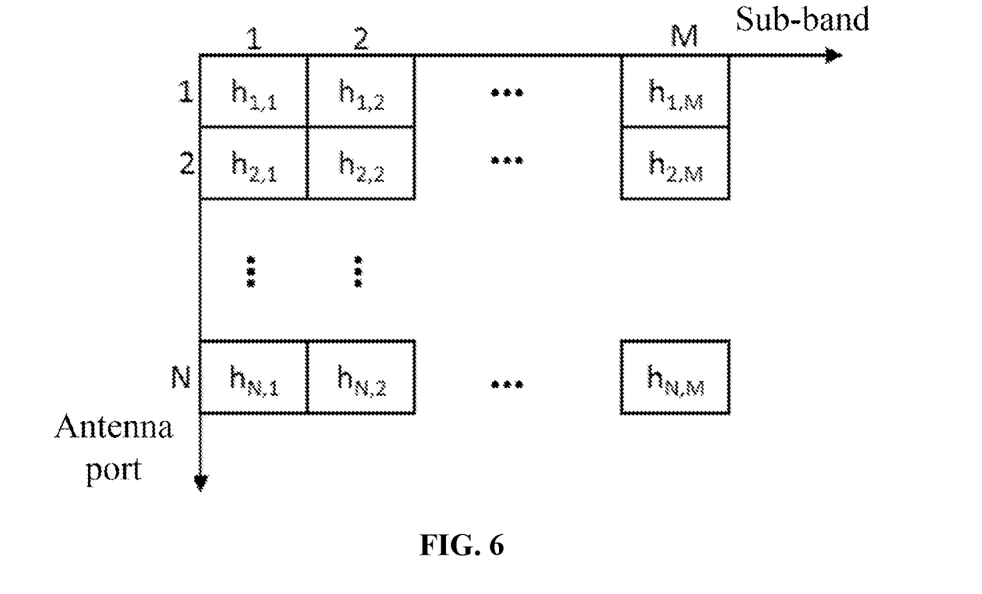
FIG. 6 is a schematic diagram of precoding information on each sub-band according to an embodiment of the present disclosure.

According to a measurement reference signal, a terminal obtains information of a wideband rank indication (RI) in a CSI feedback bandwidth, and CSI, such as a precoding matrix, preferred or recommended by the terminal on each sub-band of the CSI feedback bandwidth. FIG. 6 is a schematic diagram of precoding information on each sub-band according to an embodiment of the present disclosure. As shown in FIG. 6, in a system where the number of antenna ports is N and the CSI feedback bandwidth includes M sub-bands, the wideband RI indicates that a total of R layers exist, and the CSI of each layer is shown in FIG. 6.

The CSI of each sub-band corresponding to each antenna port on each layer is a matrix H of (N×M), and an element of an $n^{th}$ row and an $m^{th}$ column of H is $h_{n,m}$, $h_{n,m}$ denotes a CSI coefficient on an $n^{th}$ antenna port and on an $m^{th}$ sub-band.

$$H = \begin{bmatrix} h_{1,1} & \cdots & h_{1,M} \\ \vdots & \ddots & \vdots \\ h_{N,1} & \cdots & h_{N,M} \end{bmatrix}.$$

In one example of the CSI described above, an $m^{th}$ column vector in H is $$h_m = \begin{bmatrix} h_{1,m} \\ \vdots \\ h_{N,m} \end{bmatrix},$$

which denotes a precoding vector preferred or recommended by the terminal on a layer and on the $m^{th}$ sub-band.

The terminal obtains a matrix $U_d$ and a matrix $V_d$ of the CSI according to the matrix H, where $U_d$ is a matrix having N rows and d columns, and every two column vectors of $U_d$ are mutually orthogonal; and $V_d$ is a matrix having M rows and d columns, and every two column vectors of $V_d$ are mutually orthogonal. Further, the modulus of each column vector in $U_d$ and $V_d$ is 1. For example, the terminal performs the SVD on the matrix H to obtain the following matrices U and V:

$$H=UDV^H.$$

d column vectors are selected from U, and d column vectors are selected from V. For example, d column vectors in U corresponding to the d largest diagonal elements in D form the matrix $U_d$, and d column vectors in V corresponding to the d largest diagonal elements in D form the matrix $V_d$. The value of d is notified to the terminal by the base station through signaling, or the terminal determines and reports the value of d to the base station by comparing the magnitude of each diagonal element in D. The determination method may be as follows: according to a determined threshold value, column vectors in U and column vectors in V corresponding to diagonal elements in D, which are greater than the threshold value, are respectively selected into $U_d$ and $V_d$; alternatively, according to a determined threshold value, column vectors in U and column vectors in V corresponding to diagonal elements in D, each of which has a ratio to the average value of all diagonal elements in D greater than the threshold value, are respectively selected into $U_d$ and $V_d$.

The terminal reports the RI and the amplitude and phase information of each element in $U_d$ and $V_d$ corresponding to each layer.

Through the above method, the feedback overhead can be reduced to some extent and the CSI feedback can have higher precision.

Three implementations of the present embodiment described below solve that: how to consider the compression feedback of a multi-layer channel if the multi-layer channel has been calculated, what assumptions is in accordance with to calculate the CQI of a sub-band, and the way to combine with the traditional second type of codebook, that is, to feedback the amplitude and phase coefficients of a sub-band in the traditional second type by using the above-mentioned way.

Implementation Two: Multi-Layer Joint Processing

Figure 7:
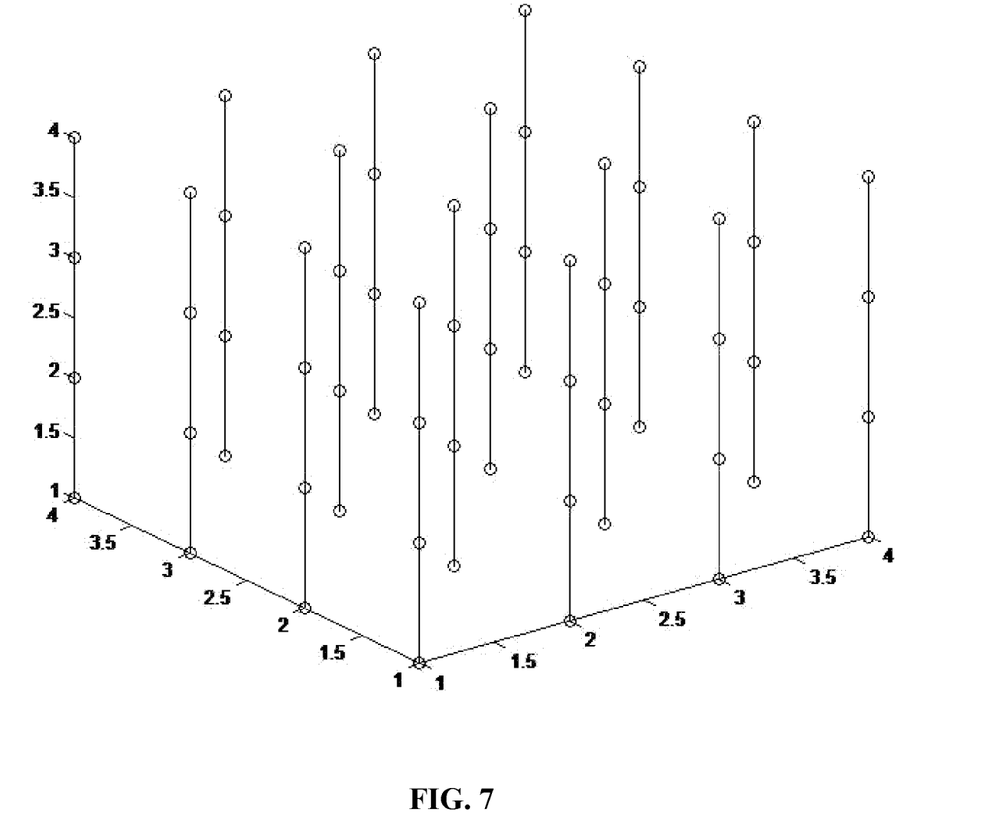
FIG. 7 is a schematic diagram of a three-dimensional matrix space according to an embodiment of the present disclosure.

In consideration, the following information may be represented by a matrix $\mathcal{H}$ in a three-dimensional space $N_1 \times N_2 \times N_3$ shown in FIG. 7: $N_1$ denotes N antenna ports, $n_1 \in \{1, \ldots, N_1\}$; $N_2$ denotes M sub-bands, $n_2 \in \{1, \ldots, N_2\}$; $N_3$ denotes R layers, $n_3 \in \{1, \ldots, N_3\}$. FIG. 7 is a schematic diagram of a three-dimensional matrix space according to an embodiment of the present disclosure. An element at the position of $(n_1, n_2, n_3)$ in $\mathcal{H}$ is $\mathcal{H}(n_1, n_2, n_3)=h_{n_1,n_2,n_3}$, $h_{n_1,n_2,n_3}$ denotes a CSI coefficient on an $n_2^{th}$ sub-band, on an $n_1^{th}$ antenna port, and on an $n_3^{th}$ layer. Further, for example, a precoding matrix preferred or recommended by the terminal on the $n_2^{th}$ sub-band is a matrix $H_m$ of $N_1 \times N_3$, and an element of an $n_1^{th}$ row and an $n_3^{th}$ column is $h_{n_1,n_2,n_3}$.

Eigenvectors in each dimension of the three dimensions are extracted through higher-order SVD (HOSVD).

$$\mathcal{H}=\mathcal{S} \times_1 U_1 \times_2 U_2 \times_3 U_3 \quad (1)$$

$U_1$, $U_2$ and $U_3$ are matrices formed by eigenvectors in three dimensions, respectively. A column vector in $U_1$ is a vector of $(N\times 1)$, a column vector in $U_2$ is a vector of $(M\times 1)$, and a column vector in $U_3$ is a vector of $(R\times 1)$. Further, each column vector in $U_1$, $U_2$ and $U_3$ is a vector having a modulus of 1.

In the formula (1) of HOSVD, the operation symbol $\times_k$ denotes a $k^{th}$-factorial multiplication of the higher-order matrix. The expression of the three-dimensional space is expressed in two-dimensional space, the SVD is performed on $\mathcal{H}_k$, and then $U_1$, $U_2$ and $U_3$ in the formula (1) may be obtained from the expression described below.

$$[\mathcal{H}]_k = U_k \cdot D_k \cdot V_k^H \quad (2)$$

K=3, k=1, 2, 3. $[\mathcal{H}]_k$ denotes an expansion matrix of the higher-order matrix $\mathcal{H}$ in a $k^{th}$ dimension, and the dimension of the expansion matrix is $N_k \times N_1 \ldots N_{k-1}N_{k+1} \ldots N_K$, that is, $$[\mathcal{H}]_k(m,n) = \mathcal{H}(n_1, n_2, \ldots, n_K).$$

$(n_1, n_2, \ldots, n_K)$ is mapped to $(m, n)$ in the following manner:

$$m = n_k$$

$$n = \begin{cases} n_1 + \sum_{i=2}^{k-1}(n_i - 1)\prod_{j=1}^{i-1} N_j, & \text{if } n \leq N_1 \ldots N_{k-1} \\ N_1 N_2 \ldots N_{k-1} + n_{k+1} + \sum_{i=k+2}^{K}(n_i - 1)\prod_{j=k+1}^{i-1} N_j, & \text{if } n > N_1 \ldots N_{k-1} \end{cases}$$

For the three-dimensional matrix in the present method, $$[\mathcal{H}]_1(m,n) = \mathcal{H}(n_1, n_2, n_3);$$

$m = n_1$, and $n = n_2 + (n_3 - 1)N_2;$ $$[\mathcal{H}]_2(m,n) = \mathcal{H}(n_1, n_2, n_3);$$

$m = n_2$, and $n = n_1 + (n_3 - 1)N_1;$ and $$[\mathcal{H}]_3(m,n) = \mathcal{H}(n_1, n_2, n_3);$$

$m = n_3$; and $n = n_1 + (n_2 - 1)N_1.$

Therefore, according to the formula (2), the SVD is performed on $[\mathcal{H}]_1$, $[\mathcal{H}]_2$, and $[\mathcal{H}]_3$ to obtain three left eigenmatrices, $U_1$, $U_2$, and $U_3$ respectively. d eigenvectors are selected from $U_1$ to obtain $U_1^{(d)}$, d eigenvectors are selected from $U_2$ to obtain $U_2^{(d)}$, and d eigenvectors are selected from $U_3$ to obtain $U_3^{(d)}$. For example, column vectors in $U_1^{(d)}$, column vectors in $U_2^{(d)}$, and column vectors in $U_3^{(d)}$ are respectively column vectors in $U_1$ corresponding to the d largest diagonal elements in $D_1$, column vectors in $U_2$ corresponding to the d largest diagonal elements in $D_2$, and column vectors in $U_3$ corresponding to the d largest diagonal elements in $D_3$. The terminal feeds back the amplitude and phase information of elements in $U_1^{(d)}$, $U_2^{(d)}$, and $U_3^{(d)}$. After the base station obtains the fed back eigenvectors, the three-dimensional space matrix $\mathcal{H}$ is constructed according to the following formula:

$$\mathcal{H}_k = U_k^{(d)} \cdot (V_k^{(d)})^T.$$

$V_k^{(d)}$ denotes a matrix sequentially formed by first d columns in the matrix $U_{k+1}^{(d)} \otimes U_{k+2}^{(d)} \ldots \otimes U_K^{(d)} \otimes U_1^{(d)} \ldots \otimes U_{k-1}^{(d)}$.

Implementation Three: CQI of a Sub-Band

In the feedback method described above, feedback of the CQI of the sub-band is further added, and the base station may obtain a precoder of the sub-band and a modulation and coding scheme (MCS) of the sub-band after processing. In this case, the assumed precoding matrix for calculating the CQI of the sub-band is a matrix distributed on each sub-band after multiplication and other processing are performed on the reported matrices.

If the feedback is processed separately for each layer, based on the SVD of a two-dimensional matrix, assuming feedback matrices of the $r^{th}$ layer are $U_d^r$ and $V_d^r$, where $r=1, \ldots, R$, the assumed precoding matrix for calculating the CQI of the $n_2^{th}$ sub-band is $$[U_d^1 V_d^{1H}(:,n_2) \ldots U_d^R V_d^{RH}(:,n_2)]$$

That is, the assumed precoding matrix for calculating the CQI of the $n_2^{th}$ sub-band is F, where $F(a, b) = G_b(a, n_2)$, and $G_b = U_d^b V_d^{bH}$.

If the feedback is processed jointly for layers, based on the reported $U_1^{(d)}$, $U_2^{(d)}$, and $U_3^{(d)}$ of HOSVD, the assumed precoding matrix for the terminal to calculate the CQI is obtained according to k=1, 2, or 3, and $[\mathcal{F}]_k = U_k^{(d)} \cdot (V_k^{(d)})^T$. $V_k^{(d)}$ denotes the matrix sequentially formed by the first d columns of the matrix $U_{k+1}^{(d)} \otimes U_{k+2}^{(d)} \ldots \otimes U_K^{(d)} \otimes U_1^{(d)} \ldots \otimes U_{k-1}^{(d)}$. According to $[\mathcal{F}]_k$ and the mapping manner provided in implementation two, the matrix $[\mathcal{F}]_k$ in two-dimensional space may be transformed to a matrix $\mathcal{F}$ of $N_1 \times N_2 \times N_3$ in three-dimensional space. Using k=2 as an example, $[\mathcal{F}]_2 = U_2^{(d)} (V_2^{(d)})^T$, $V_2^{(d)}$ denotes the matrix sequentially formed by first d columns of a matrix $U_3^{(d)} \otimes U_1^{(d)}$. That is, $V_2^{(d)}(x, y) = E_2^d(x,y)$ and $E_2^d = U_3^{(d)} \otimes U_1^{(d)}$, where $x=1, \ldots, N_1 N_3$, and $y=1, \ldots, d$. The assumed precoding matrix for calculating the CQI of the $n_2^{th}$ sub-band is $\mathcal{F}(:,n_2,:)$. That is, the assumed precoding matrix on the $n_2^{th}$ sub-band is F, $F(a, b) = \mathcal{F}(a, n_2, b) = [\mathcal{F}]_2(n_2, s)$, where $s = a + (b-1)N_1$.

Implementation Four: Feedback is Performed by Combing with the Traditional Second Type of Codebook When the second type of codebook is configured for feedback, one way is to obtain $N_1$ (equal to 2L) codebook base vectors, $N_2$ (equal to M) sub-bands and $N_3$ (equal to R) layers through weighting and combination of L codebook base vectors, and obtain and feedback the CSI through separate processing of each layer or joint processing of layers according to the way in the implementation one or the implementation two. Two sub-methods described below are provided.

Sub-Method A:

For N antenna ports, the weighting coefficient of each sub-band corresponding to each codebook base vector on each layer is a matrix H of (2L×M), and an element of the $n^{th}$ row and an $m^{th}$ column of H is $h_{n,m}$. When $n \leq L$, $h_{n,m}$ denotes a weighting coefficient of the $n^{th}$ codebook base vector corresponding to the first half of antenna ports, i.e., port 1 to port N/2, on an $m^{th}$ sub-band; when $n > L$, $h_{n,m}$ denotes a weighting coefficient of the $(n-L)^{th}$ codebook base vector corresponding to the second half of antenna ports, i.e., port (N/2+1) to port N, on the $m^{th}$ sub-band. Therefore, $$H = \begin{bmatrix} h_{1,1} & \ldots & h_{1,M} \\ \vdots & \ddots & \vdots \\ h_{2L,1} & \ldots & h_{2L,M} \end{bmatrix}.$$

The terminal obtains the matrix $U_d$ and the matrix $V_d$ according to the matrix H, where $U_d$ is a matrix having 2L rows and d columns, and every two column vectors of $U_d$ are mutually orthogonal; and $V_d$ is a matrix having M rows and d columns, and every two column vectors of $V_d$ are mutually orthogonal. Further, the modulus of each column vector in $U_d$ and $V_d$ is 1. For example, the terminal performs the SVD on the matrix H to obtain the following matrices U and V:

$$H = UDV^H.$$

d column vectors are selected from U, and d column vectors are selected from V. For example, d column vectors in U corresponding to the d largest diagonal elements in D form the matrix $U_d$, and d column vectors in V corresponding to the d largest diagonal elements in D form the matrix $V_d$. The value of d is notified to the terminal by the base station through signaling, or the terminal determines and reports the value of d to the base station by comparing the magnitude of each diagonal element in D. The determination method may be as follows: according to a determined threshold value, column vectors in U and column vectors in V corresponding to diagonal elements in D, which are greater than the threshold value, are respectively selected into $U_d$ and $V_d$; alternatively, according to a determined threshold value, column vectors in U and column vectors in V corresponding to diagonal elements in D, each of which has a ratio to the average value of all diagonal elements in D greater than the threshold value, are respectively selected into $U_d$ and $V_d$.

The terminal reports that RI=R to indicate a precoding matrix indicator (PMI) of the codebook base vector and the amplitude and phase information of each element in $U_d$ and $V_d$ corresponding to each layer. The feedback matrices of the $r^{th}$ layer are $U_d^r$ and $V_d^r$.

The terminal reports the CQI of a sub-band. The assumed precoding matrix for calculating the CQI of a sub-band on the $m^{th}$ sub-band is $$\begin{bmatrix} W_1 & 0 \\ 0 & W_1 \end{bmatrix} W_2^m = \begin{bmatrix} v_1, \ldots, v_L & 0 \\ 0 & v_1, \ldots, v_L \end{bmatrix} \begin{bmatrix} c_{1,1}(m) & & c_{1,R}(m) \\ \vdots & & \vdots \\ c_{L,1}(m) & & c_{L,R}(m) \\ c_{L+1,1}(m) & \cdots & c_{L+1,R}(m) \\ \vdots & & \vdots \\ c_{2L,1}(m) & & c_{2L,R}(m) \end{bmatrix}.$$

$W_1(p, l) = v_l(p)$, and $W_2^m(n, r) = c_{n,r}(m)$. $v_1, \ldots, v_L$ are L codebook base vectors, $c_{n,r}(m) = G_r(n, m)$, and $G_r = U_d^r V_d^{rH}$.

Sub-Method B:

For N antenna ports and considering L codebook base vectors, the following channel information may be represented by a matrix $\mathcal{H}$ in three-dimensional matrix space $N_1 \times N_2 \times N_3$ (as shown in FIG. 7): $N_1 = 2L$, $n_1 \in \{1, \ldots, N_1\}$; $N_2$ denotes M sub-bands, $n_2 \in \{1, \ldots, N_2\}$; $N_3$ denotes R layers, $n_3 \in \{1, \ldots, N_3\}$. An element at the position of $(n_1, n_2, n_3)$ in $\mathcal{H}$ is $\mathcal{H}(n_1, n_2, n_3) = h_{n_1,n_2,n_3}$. When $n_1 \leq L$, $h_{n_1,n_2,n_3}$ denotes a weighting coefficient of the $n_1^{th}$ codebook base vector corresponding to the first half of antenna ports, i.e., port 1 to port N/2, on the $n_2^{th}$ sub-band and on the $n_3^{th}$ layer; when $n_1 > L$, $h_{n_1,n_2,n_3}$ denotes a weighting coefficient of the $(n_1-L)^{th}$ codebook base vector corresponding to the second half of antenna ports, i.e., port (N/2+1) to port N, on the $n_2^{th}$ sub-band and the $n_3^{th}$ layer.

Eigenvectors in each dimension of the three dimensions are extracted through the higher-order SVD (HOSVD).

$$\mathcal{H} = \mathcal{S} \times_1 U_1 \times_2 U_2 \times_3 U_3 \qquad (1)$$

$U_1$, $U_2$ and $U_3$ are matrices formed by eigenvectors in three dimensions, respectively. A column vector in $U_1$ is a vector of (N×1), a column vector in $U_2$ is a vector of (M×1), and a column vector in $U_3$ is a vector of (R×1). Further, each column vector in $U_1$, $U_2$ and $U_3$ is a vector having a modulus of 1.

In the formula (1) of HOSVD, the operation symbol $\times_k$ denotes a $k^{th}$-factorial multiplication of the higher-order matrix. The expression of the three-dimensional space is expressed in two-dimensional space, the SVD is performed on $[\mathcal{H}]_k$, and then $U_1$, $U_2$ and $U_3$ in the formula (1) may be obtained from the expression described below.

$$[\mathcal{H}]_k = U_k \cdot D_k \cdot V_k^H \qquad (2)$$

K=3, k=1, 2, 3. $[\mathcal{H}]_k$ denotes an expansion matrix of the higher-order matrix $\mathcal{H}$ in a $k^{th}$ dimension, and the dimension of the expansion matrix is $N_k \times N_1 \ldots N_{k-1} N_{k+1} \ldots N_K$. For the three-dimensional matrix in the method, $[\mathcal{H}]_1(m,n) = \mathcal{H}_{(n_1,n_2,n_3)};$ $m=n_1$, and $n=n_2+(n_3-1)N_2;$ $[\mathcal{H}]_2(m,n) = \mathcal{H}_{(n_1,n_2,n_3)};$ $m=n_2$, and $n=n_1+(n_3-1)N_1;$ and $[\mathcal{H}]_3(m,n) = \mathcal{H}_{(n_1,n_2,n_3)};$ $m=n_3$; and $n=n_1+(n_2-1)N_1.$ Therefore, according to the formula (2), the SVD is performed on $[\mathcal{H}]_1$, $[\mathcal{H}]_2$, and $[\mathcal{H}]_3$ to obtain three left eigenmatrices, $U_1$, $U_2$, and $U_3$ respectively. d eigenvectors are selected from $U_1$ to obtain $U_1^{(d)}$, d eigenvectors are selected from $U_2$ to obtain $U_2^{(d)}$, and d eigenvectors are selected from $U_3$ to obtain $U_3^{(d)}$. For example, column vectors in $U_1^{(d)}$, column vectors in $U_2^{(d)}$, and column vectors in $U_3^{(d)}$ are respectively column vectors in $U_1$ corresponding to the d largest diagonal elements in $D_1$, column vectors in $U_2$ corresponding to the d largest diagonal elements in $D_2$, and column vectors in $U_3$ corresponding to the d largest diagonal elements in $D_3$. The terminal reports that RI=R to indicate the PMI of the codebook base vector and the amplitude and phase information of elements in $U_1^{(d)}$, $U_2^{(d)}$, and $U_3^{(d)}$). For k=1, 2 or 3, $[\mathcal{F}]_k U_k^{(d)} \cdot (V_k^{(d)})^T.$ $V_k^{(d)}$ denotes a matrix sequentially formed by first d columns of a matrix $U_{k+1}^{(d)} \otimes U_{k+2}^{(d)} \ldots \otimes U_K^{(d)} \otimes U_1^{(d)} \ldots \otimes U_{k-1}^{(d)}.$ When the CQI of the $n_2^{th}$ sub-band is calculated, the assumed precoding is $$\begin{bmatrix} W_1 & 0 \\ 0 & W_1 \end{bmatrix} W_2^{n_2} = \begin{bmatrix} v_1, \ldots, v_L & 0 \\ 0 & v_1, \ldots, v_L \end{bmatrix} W_2^{n_2}.$$

$W_1(p,1) = v_l(p)$, $W_2^{n_2}(a,b) = [\mathcal{F}]_2(n_2,s)$, $s = a+(b-1)N_1$, and $[\mathcal{F}]_2 = U_2^{(d)}(V_2^{(d)})^T$. $V_2^{(d)}$ denotes a matrix sequentially formed by first d columns of $U_3^{(d)} \otimes U_1^{(d)}$. That is, $V_2^{(d)}$ (x, y) = $E_2^d$(x, y), and $E_2^d = U_3^{(d)} \otimes U_1^{(d)}$, where x=1, ..., N1N3, and y=1, ..., d.

Embodiment Four

A storage medium is further provided in the embodiment of the present application. The storage medium stores a computer program. The computer program is configured to, when executed, perform the steps of any one of the preceding method embodiments.

Alternatively, in the embodiment, the preceding storage medium may be configured to store a computer program for performing steps described below.

In S1, a matrix H is decomposed to obtain a matrix $U_d$ and a matrix $V_d$, where $U_d$ is a matrix having d columns, and every two column vectors of $U_d$ are mutually orthogonal; and $V_d$ is a matrix having d columns, and every two column vectors of $V_d$ are mutually orthogonal.

In S2, amplitude and phase information of elements in $U_d$ including d left eigenvectors is fed back, and/or, amplitude and phase information of elements in $V_d$ including d right eigenvectors is fed back.

Alternatively, in the embodiment, the preceding storage medium may include, but is not limited to, a USB flash drive, a read-only memory (ROM), a random access memory (RAM), a mobile hard disk, a magnetic disk, an optical disk or another medium capable of storing a computer program.

An electronic apparatus is further provided in the embodiment of the present application, and includes a memory and a processor. The memory stores a computer program and the processor is configured to execute the computer program to perform the steps of any one of the preceding method embodiments.

Alternatively, the electronic apparatus may further include a transmission device and an input and output device. Both the transmission device and the input and output device are connected to the processor.

Alternatively, in the embodiment, the processor may be configured to perform steps described below through a computer program.

In S1, a matrix H is decomposed to obtain a matrix $U_d$ and a matrix $V_d$, where $U_d$ is a matrix having d columns, and every two column vectors of $U_d$ are mutually orthogonal; and $V_d$ is a matrix having d columns, and every two column vectors of $V_d$ are mutually orthogonal.

In S2, amplitude and phase information of elements in $U_d$ including d left eigenvectors is fed back, and/or amplitude and phase information of elements in $V_d$ including d right eigenvectors is fed back.

Alternatively, for examples in the embodiment, reference may be made to the examples described in the preceding embodiments and optional implementations. Repetition is not made here in the embodiment.

Apparently, it should be understood by those skilled in the art that each of the modules or steps of the present application described above may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any combination of hardware and software.

The above are only preferred embodiments of the present application and are not intended to limit the present application, and for those skilled in the art, the present application may have various modifications and variations. Any modification, equivalent substitution, improvement and the like made within the principle of the present disclosure shall fall within the scope of the present application.

What is claimed is:

1. An information feedback method, comprising:
 decomposing a channel state information (CSI) matrix H to obtain a matrix $U_d$ and a matrix $V_d$, wherein $U_d$ is a matrix having d columns, and every two column vectors of the d columns are mutually orthogonal; and $V_d$ is a matrix having d columns, and every two column vectors of the d columns are mutually orthogonal; and
 feeding back at least one of: amplitude and phase information of elements in $U_d$ comprising d left eigenvectors, or amplitude and phase information of elements in $V_d$ comprising d right eigenvectors,
 wherein decomposing the CSI matrix H to obtain the matrix $U_d$ and the matrix $V_d$ comprises:
 performing singularly valuable decomposition (SVD) on the CSI matrix H to obtain the matrix $U_d$ and the matrix $V_d$,
 wherein the matrix H is formed by combining R layers of CSI,
 wherein decomposing the matrix H comprises E times of SVD, wherein $E \geq 1$; and a number of rows of a matrix decomposed by an eth time of SVD is equal to at least one of:
 a number of antenna ports, one of a number of codebook base vectors or twice a number of codebook base vectors, a number of sub-bands, or a number of channel layers; wherein $1 \geq e \geq E$, and e is an integer.

2. The method of claim 1, wherein the matrix H is formed by combining precoding matrices on a plurality of sub-bands for an $r^{th}$ layer, wherein $1 \leq r \leq R$, r is an integer, and R is a total number of channel layers.

3. The method of claim 1, wherein a value of d is determined in at least one of the following manners:
 determining through signaling configured by a base station;
 determining, according to a first threshold value determined by a terminal or configured by a base station, a number of eigenvalues, which are greater than the first threshold value, as the value of d; or
 determining, according to a second threshold value determined by a terminal or configured by a base station, that the value of d is one of: a number of eigenvalues, each of which has a ratio to an average value of all eigenvalues greater than the second threshold value, or a number of eigenvalues, each of which has a ratio to a minimum value of all eigenvalues greater than the second threshold value.

4. The method of claim 1, wherein decomposing the matrix H comprises E times of SVD, wherein $E \geq 1$; and a number of columns of a matrix decomposed by an $e^{th}$ time of SVD is equal to at least one of:
 a number of antenna ports; one of a number of codebook base vectors or twice a number of codebook base vectors; a number of sub-bands; a number of channel layers; or a product of at least two of: a number of antenna ports, one of a number of codebook base vectors or twice a number of codebook base vectors, a number of sub-bands, or a number of channel layers;
 wherein $1 \leq e \leq E$, and e is an integer.

5. The method of claim 1, wherein decomposing the matrix H comprises E times of SVD, wherein $E \geq 1$; and a serial number of a corresponding element in a matrix decomposed by an $e^{th}$ time of SVD is obtained by a linear transformation of at least one of a serial number of a port, a serial number of a sub-band, or a serial number of a layer.

6. The method of claim 1, wherein the matrix H satisfies at least one of that:
 a number of rows is equal to a number of sub-bands, a number of columns is equal to a product of a number of ports and a number of layers, and one of an element of an $m^{th}$ row and an $[n+(r-1)N]^{th}$ column or an element of an $m^{th}$ row and an $[r+(n-1)R]^{th}$ column is a precoding coefficient on an $n^{th}$ port, an $m^{th}$ sub-band and an $r^{th}$ layer;
 a number of rows is equal to a number of antenna ports, a number of columns is equal to a product of a number of sub-bands and a number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, an $m^{th}$ sub-band and an $r^{th}$ layer; or
 a number of rows is equal to a number of layers, a number of columns is equal to a product of a number of sub-bands and a number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, an $m^{th}$ sub-band and an $r^{th}$ layer;
 wherein N is the number of antenna ports of a channel state information reference signal (CSI-RS), M is the number of sub-bands contained in a CSI feedback bandwidth, and R is the number of layers.

7. An information feedback method, comprising:
 receiving at least one of the following information fed back by a user equipment (UE): first amplitude and phase information of elements in $U_d$ comprising d left eigenvectors or second amplitude and phase information of elements in $V_d$ comprising d right eigenvectors;
 wherein $U_d$ is a matrix having d columns, and every two column vectors of the d columns are mutually orthogonal; and $V_d$ is a matrix having d columns, and every two column vectors of the d columns are mutually orthogonal; and
 determining at least one of the first amplitude and phase information or the second amplitude and phase information as channel state information (CSI) of the UE,
 wherein $U_d$ and $V_d$ are matrices obtained by performing singularly valuable decomposition (SVD) on a CSI matrix H,
 wherein the matrix H is formed by combining R layers of CSI, wherein decomposing the matrix H comprises E times of SVD, wherein E≥1; and a number of rows of a matrix decomposed by an $e^{th}$ time of SVD is equal to at least one of:

a number of antenna ports, one of a number of codebook base vectors or twice a number of codebook base vectors, a number of sub-bands, or a number of channel layers; wherein 1≤e≤E, and e is an integer.

8. The method of claim 7, wherein the matrix H is formed by combining precoding matrices on a plurality of sub-bands for an $r^{th}$ layer, wherein 1≤r≤R, r is an integer, and R is a total number of channel layers.

9. The method of claim 7, wherein a value of d is determined in at least one of the following manners:

determining through signaling configured by a base station;

determining the value of d to be a number of eigenvalues which are greater than a first threshold value, wherein the first threshold value is determined by the UE or configured by a base station; or determining the value of d to be one of: a number of eigenvalues, each of which has a ratio to an average value of all eigenvalues greater than a second threshold value, or a number of eigenvalues, each of which has a ratio to a minimum value of all eigenvalues greater than a second threshold value; wherein the second threshold value is determined by the UE or configured by a base station.

10. The method of claim 7, wherein decomposing the matrix H comprises E times of SVD, wherein E≥1; and a number of columns of a matrix decomposed by an $e^{th}$ time of SVD is equal to at least one of:

a number of antenna ports; one of a number of codebook base vectors or twice a number of codebook base vectors; a number of sub-bands; a number of channel layers; or a product of at least two of: a number of antenna ports, one of a number of codebook base vectors or twice a number of codebook base vectors, a number of sub-bands, or a number of channel layers; wherein 1≤e≤E, and e is an integer.

11. The method of claim 7, wherein decomposing the matrix H comprises E times of SVD, wherein E≥1; and a serial number of a corresponding element in a matrix decomposed by an $e^{th}$ time of SVD is obtained by a linear transformation of at least one of a serial number of a port, a serial number of a sub-band, or a serial number of a layer.

12. The method of claim 7, wherein the matrix H satisfies at least one of that:

a number of rows is equal to a number of sub-bands, a number of columns is equal to a product of a number of ports and a number of layers, and one of an element of an $m^{th}$ row and an $[n+(r-1)N]^{th}$ column or an element of an $m^{th}$ row and an $[r+(n-1)R]^{th}$ column is a precoding coefficient on an $n^{th}$ port, on an $m^{th}$ sub-band and on an $r^{th}$ layer;

a number of rows is equal to a number of antenna ports, a number of columns is equal to a product of a number of sub-bands and a number of layers, and one of an element of an $n^{th}$ row and an $[m+(r-1)M]^{th}$ column or an element of an $n^{th}$ row and an $[r+(m-1)R]^{th}$ column is a precoding coefficient on an $n^{th}$ port, on an $m^{th}$ sub-band and on an $r^{th}$ layer; or a number of rows is equal to a number of layers, a number of columns is equal to a product of a number of sub-bands and a number of antenna ports, and one of an element of an $r^{th}$ row and an $[m+(n-1)M]^{th}$ column or an element of an $r^{th}$ row and an $[n+(m-1)N]^{th}$ column is a precoding coefficient on an $n^{th}$ port, on an $m^{th}$ sub-band and on an $r^{th}$ layer;

wherein N is the number of antenna ports of a channel state information reference signal (CSI-RS), M is the number of sub-bands contained in a CSI feedback bandwidth, and R is the number of layers.

13. An information feedback terminal, comprising:

a decomposition module, which is configured to decompose a channel state information (CSI) matrix H to obtain a matrix $U_d$ and a matrix $V_d$, wherein $U_d$ is a matrix having d columns, and every two column vectors of the d columns are mutually orthogonal; and $V_d$ is a matrix having d columns, and every two column vectors of the d columns are mutually orthogonal; and a feedback module, which is configured to feed back at least one of: amplitude and phase information of elements in $U_d$ comprising d left eigenvectors, or amplitude and phase information of elements in $V_d$ comprising d right eigenvectors, wherein to decompose the CSI matrix H to obtain the matrix $U_d$ and the matrix $V_d$ comprises:

performing singularly valuable decomposition (SVD) on the CSI matrix H to obtain the matrix $U_d$ and the matrix $V_d$, wherein the matrix H is formed by combining R layers of CSI, wherein decomposing the matrix H comprises E times of SVD, wherein E≥1; and a number of rows of a matrix decomposed by an eth time of SVD is equal to at least one of:

a number of antenna ports, one of a number of codebook base vectors or twice a number of codebook base vectors, a number of sub-bands, or a number of channel layers; wherein 1≤e≤E, and e is an integer.

14. An information feedback base station, comprising a memory and a processor, wherein the memory is configured to store a computer program, the processor is configured to execute the computer program to perform the method of claim 7, and the processor comprises:

a receiving module, which is configured to receive at least one of the following information fed back by a user equipment (UE): first amplitude and phase information of elements in $U_d$ comprising d left eigenvectors, or second amplitude and phase information of elements in $V_d$ comprising d right eigenvectors; wherein $U_d$ is a matrix having d columns, and every two column vectors of the d columns are mutually orthogonal; and $V_d$ is a matrix having d columns, and every two column vectors of the d columns are mutually orthogonal; and a determination module, which is configured to determine at least one of the first amplitude and phase information or the second amplitude and phase information as channel state information (CSI) of the UE, wherein $U_d$ and $V_d$ are matrices obtained by performing singularly valuable decomposition (SVD) on a CSI matrix H, wherein the matrix H is formed by combining R layers of CSI, wherein decomposing the matrix H comprises E times of SVD, wherein E≥1; and a number of rows of a matrix decomposed by an $e^{th}$ time of SVD is equal to at least one of:

a number of antenna ports, one of a number of codebook base vectors or twice a number of codebook base vectors, a number of sub-bands, or a number of channel layers; wherein $1 \leq e \leq E$, and e is an integer.

* * * * *